Figure 1:
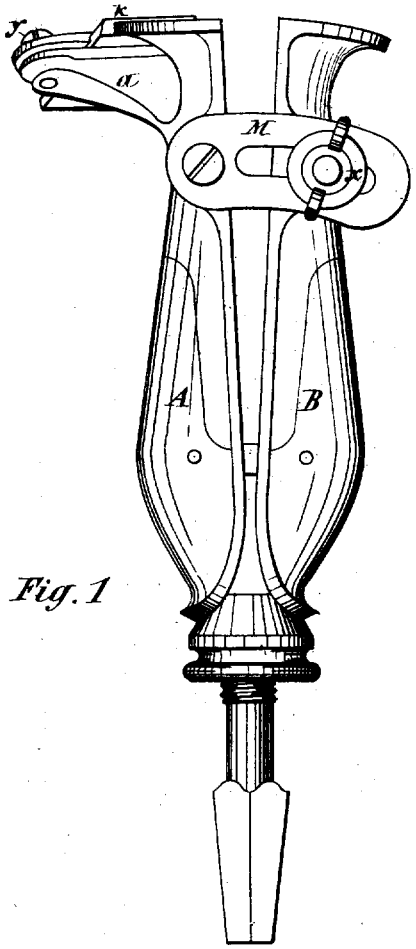

G. N. STEARNS.

Hollow Auger.

No. 9,293. Reissued July 13, 1880.

WITNESSES:

E. Laass.

G. W. Hey.

INVENTOR:

Geo. N. Stearns per. Duell, Laass & Hey, Att'ys.

N. PETERS, PHOTO-LITHOGRAPHER, WASHINGTON, D. C.

UNITED STATES PATENT OFFICE.

GEORGE N. STEARNS, OF SYRACUSE, NEW YORK.

HOLLOW AUGER.

SPECIFICATION forming part of Reissued Letters Patent No. 9,293, dated July 13, 1880.

Original No. 201,064, dated March 5, 1878. Application for reissue filed May 26, 1879.

*To all whom it may concern:*

Be it known that I, GEORGE N. STEARNS, of Syracuse, New York, have invented certain new and useful Improvements in Hollow Augers; and I declare the following to be such a clear and exact description of the same as to enable any person skilled in the art to which it appertains to make and use the same.

My improvements are twofold; and they consist, first, of improved devices adapted to be applied to the expanding sections or sides of hollow augers, overcoming entirely the tendency to spread in tenoning spokes, and are particularly adapted to the hollow auger shown in my Patent No. 130,826, dated August 27, 1872, in which there are two expanding jaw-sections pivoted to and operating on a vertically-extended shank-stock, and having a single straight plain-faced strap rigidly attached to one section and slotted, through which a set-screw passes into the other section to hold the jaws together.

Experience has demonstrated that the top fastenings of the expanding sections, when constructed in the manner described, were entirely inadequate to successfully resist the great strain and tendency to spread in use, the plain-faced straight strap on one side not only slipping, but also allowing the jaws to spring and twist whenever a tough hard spoke was encountered, thereby rendering it impossible to cut a circular tenon. To remedy this I now provide a wedge-shaped strap having its greatest thickness at the free end and provided at the same with a curved slot, through which a screw-bolt passes. On the opposite side of the auger I apply a corresponding wedge-strap attached in the same manner, both straps being securely tightened by a thumb-nut on the threaded end of the bolt passing through the stock. It will be observed that when the tool is set for use and the thumb-nut is screwed down tight the wedge straps oppose a resistance which increases as the strain on the cutter-head becomes greater, and by the extension of the clamp-bolt through the stock and through the two clamp-bars, the latter are securely connected with each other as well as to the stock, and the strain upon one side of the auger, drawing upon the clamp-bolt, is thus transmitted to the opposite side of the auger and equalized.

My improvements also consist in peculiar means of sustaining the cutter or knife of the auger in its operative position, whereby the same is readily adjusted to the required cut and effectually and firmly held to its work.

For a more specific description of my invention reference is had to the accompanying drawings, forming a part of this specification, like letters indicating corresponding parts, in which—

Figure 4:
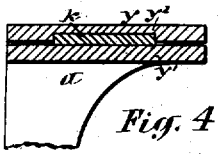
Figure 2:
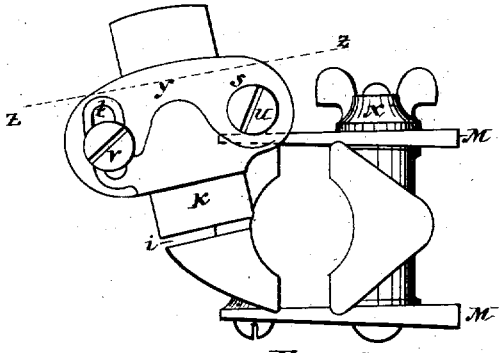
Figure 3:
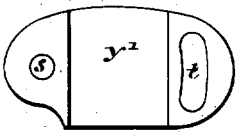

Figure 1 is a side view. Fig. 2 is a top or plan view; Fig. 3, clamp-bar detached; and Fig. 4, vertical section on line *z z*, Fig. 2.

A represents the cutter-section or cutter-carrying jaw of a hollow auger, connected near its head to the gage-section B by wedge-shaped straps M M applied to opposite sides thereof, as shown in Fig. 2 of the drawings. These straps are secured at their thinnest end to the cutter-section A, and provided at their free and thickest end with a curved slot, through which passes a clamp-bolt extended through the gage-section B, and having on the outside of one strap, M, a head, and at the outside of the other strap, M, a thumb-nut, X, by means of which the said straps are clamped to the section B, and thus by the manipulation of a single nut the jaws of the auger are firmly held the requisite distance apart, the taper of the straps re-enforcing the hold correspondingly with the strain applied, as before set forth.

K is the cutter or knife of the auger, secured to a plain-faced enlargement or outward projection, *a*, of the cutter-head by a clamp strap or cap, *y*, extended across the shank of the knife, and clamped to the cutter-head by clamp-screws *v* and *u*, which pass through the cap *y* at opposite sides of the knife and enter threaded eyes or sockets in the projection *a* of the cutter-head. The clamp strap or cap *y* is provided on its under side with a recess, *y'*, in which the shank of the cutter is fitted so as to prevent all lateral play of same. The recess *y'* is of a depth to allow a portion of the cutter to project above the face of the cap *y* and prevent the latter from bearing on the cutter-head when applied, thus bringing all the pressure of the cap directly on the shank of the cutter, and by its frictional hold upon the same securely holding it in its position.

By elongating the passage *t* for the outer bolt, *v*, through the strap *y* and using the inner bolt, *u*, as a pivot, the strap can be swung in or out, and the cutter K, being carried in the recess *y'*, is thus adjusted to the required cut. A throat or opening, *i*, is provided in front of the cutter for the escape of the shavings or cuttings.

I am aware that tool-holders have been adjustably connected to lathes or machines for turning off pulleys in a manner similar to that in which I secure the cutter itself directly to the cutter-head of a hollow auger; hence I do not claim said devices, except when combined with a hollow auger, as last set forth and hereinbefore fully described.

Having thus described my invention, what I claim as new, and desire to secure by Letters Patent, is—

1. A hollow auger having the cutter adjustably secured to a plain-faced projection of the cutter-head by a cap applied across the cutter and holding the same in a recessed seat on the under side of said cap, and secured in position by a pivotal screw at one side of the cutter and a clamp-screw passing through an elongated orifice in the cap at the opposite side of the cutter, substantially as specified and shown.

2. In combination with an expansible stock, the wedge-shaped strap M, attached at its thinnest end to one of the jaws, and clamped at its thickest end to the other jaw by a bolt passing through a slot in the strap, substantially as described, for the purpose set forth.

3. The combination, with the jaws A and B, of the wedge-shaped straps M M, applied to opposite sides thereof, attached at their thin end to the jaw A, and provided at their thick free end with a curved slot, and a clamping-bolt extended through the jaw B and through the two clamp-bars, and provided at one end with a head and at the opposite end with a clamp-nut, X, substantially as described and shown, for the purpose set forth.

In testimony that I claim the foregoing I have hereunto set my hand this 15th day of May, A. D. 1879, in presence of two attesting witnesses.

G. N. STEARNS.

Witnesses:
WM. W. TEALL,
C. BENDIXEN.